Patented Dec. 5, 1950

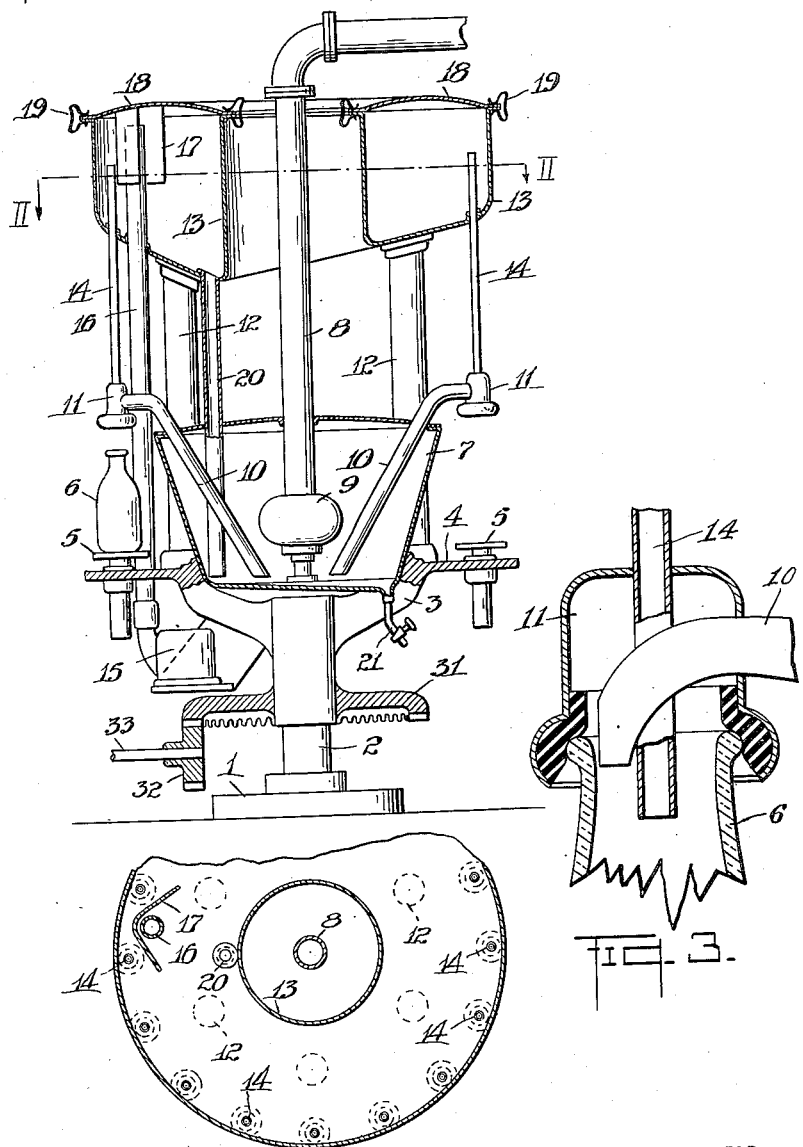

2,533,109

UNITED STATES PATENT OFFICE 2,533,109

ROTATABLE SUCTION CONTAINER FILLING MACHINE

Hans Hannover, Hellerup, Copenhagen, Denmark

Application July 18, 1945, Serial No. 605,777
In Sweden July 26, 1944

2 Claims. (Cl. 226—116)

The invention relates to rotatable suction container filling machines for filling bottles and other containers with liquid by using vacuum.

Such machines are used to a great extent for filling bottles with milk and other liquids for public consumption on a great scale. They generally consist of a supply vessel for the filling liquid, a supply tube for delivering said liquid to the vessel, a vacuum container mounted above said supply vessel and a number of nozzles, each mounted over a table supporting the containers to be filled, each of said nozzles being connected by means of filling tubes to the supply vessel and by means of vacuum tubes to the vacuum container.

In machines already known of this type the stationary supply tube outside the machine is connected with the rotating part of the machine by means of one or more packing boxes, this being the case whether the stationary supply tube is led to the liquid supply vessel from down below or from the top through the vacuum container. Such packing boxes are very sensitive and hampers the use of convenient lids on the vacuum container.

The invention has for its main object to provide an improved machine of this type, in which the supply tube without interfering with the vacuum container can be mounted stationary coaxially with the rotation axis of the machine and leading down to the supply vessel from the top of the machine without making use of any packing boxes at all.

This object is, according to the invention attained through the use of an annular vacuum container surrounding the rotation axis of the machine, hereby making it possible to place the supply tube in the free inner space of the annular vessel.

Further, the invention has for its object to provide a machine in which the vacuum tubes, connecting the filling nozzles with the vacuum container consist of vertical rectilinear tubes without making use of a vacuum container of excessively large volume.

Another object attained in the new form of the vacuum container is that such annular container is easily cleansed, as also, when the machine is very large, it is possible to reach all its parts from the outside.

On the drawing a rotatable suction container filling machine in accordance with the invention is shown by way of example.

Fig. 1 shows the machine in side view partly in vertical section and

Fig. 2 section along line II—II in Fig. 1.

Figure 3 is a vertical sectional view of one of the filling nozzles as it engages a container for the filling operation.

In a stationary frame 1 a vertical main axle 2 is mounted. This axle bears a rotatable support 3, which is provided with a toothed wheel 31, which meshes with a pinion 32 mounted on a motor driven axle 33, whereby the rotatable support can rotate around the main-axle 2, driven by the axle 33.

Support 3 bears a mounting plate 4 with tables 5 which in a manner known per se, can be raised and lowered and which serve as a support for bottles 6, in which the fluid is to be filled. On mounting plate 4 a liquid supply vessel 7 is also mounted. The liquid is delivered through a supply tube centrally mounted on the machine but independent of the revolving parts of the same. In supply vessel 7 the tube has a float 9 for the adjustment of the supply. In the construction shown in the drawing this tube 8 is supported by a bearing in the supply vessel.

Filling tubes 10 lead from supply vessel 7 to filling nozzles 11 mounted vertically over tables 5 in such a manner that one nozzle is arranged over each table. On support 3 pillars 12 are mounted and they support vacuum container 13 which, in accordance with the invention, has an annular shape and surrounds the rotation axis of the machine. In the construction shown in the drawing supply tube 8 is arranged in the central free space of said annular vessel. It is only of importance that the vacuum container has an annular form in such a way, that it surrounds a free space in the central part of the container. The container itself need not be of a circular shape as shown in the drawing but can have other forms e. g. polygonal shapes, which may be found desirable when constructing the machine.

In the shape shown in the drawing, nozzles 11 are connected with the vacuum container by means of vertical rectilinear vacuum tubes 14. To make these tubes vertical the outside diameter of vessel 13 is of such a great diameter that the outside circumference of the container extends beyond the nozzles 11.

On support 3 is mounted a vacuum pump 15 which is connected with vacuum vessel 13 by means of a suction tube 16. In order to screen the suction tube 16 from vacuum tubes 14 a splash screen 17 is used which is mounted upon a lid 18 which covers vacuum vessel 13 and is held airtight pinched on the vacuum container by means of spring pinchers 19 or the like. Hereby is attained that the lid easily can be removed for cleansing of the vacuum container. The lid can be sectioned, whereby the handling is facilitated. A return tube 20 is leading down to the supply vessel 7 from the bottom of the vacuum vessel. To enable a full emptying of the vacuum container, the bottom in this vessel 13 is made to be slanting from all sides towards return tube 20. The supply vessel has an emptying tube 21 in which a stop-cock is mounted. Also the bottom in the supply tube is made to be slanting towards the emptying tube 21.

When working, float 9 holds a constant liquid level in supply vessel 7 whereby the vacuum in the machine determines a certain liquid level in vacuum container 17, whereby the level difference corresponds to the pressure difference between the two containers. When a bottle 6 is pressed against one of the nozzles 11 the air in the bottle will be partially sucked out through the corresponding vacuum tube 14, whereby liquid from the liquid supply vessel will be sucked into the bottle through the corresponding filling tube 10. The flow of liquid will stop, when the bottle is filled. When the bottle is then removed from nozzle 11 liquid in the vacuum tube 14 will be sucked up into vacuum container 13, where the splash screen 17 will prevent this liquid from splashing into the suction tube 16. The liquid sucked up in this way will return to the supply vessel 7 through return tube 20. In operation, only one container at a time is presented to its associated nozzle for filling, the raising and lowering of the tables 5 being accomplished in any one of the many ways well known to those skilled in the art, one example being shown in U. S. patent to Broadhurst, No. 1,665,948, April 10, 1928.

For the cleansing of the machine the liquid is emptied through emptying tube 21, whereby vacuum vessel 13 is automatically and fully emptied through tube 20. When removing lid 18, vessel 13 and tubes 14, 16 and 20 can easily be cleansed, as all these tubes are rectilinear and vertical. Hereby the cleansing of the machine is facilitated to a very great extent.

As supply tube 8 is fully independent of the vacuum vessel 13, this tube being stationary mounted in the free space which is surrounded by the annular vessel 13 and resting on a bearing in the bottom of the liquid vessel, the machine works very reliably without the use of any packing boxes in connection with the supply tube, and the invention thus brings about great improvements as well regarding the hygienic as constructional conditions in relation to machines previously known of this kind.

The drawing and the description only show an example of a machine constructed in accordance with the invention. Many alterations can be made without departing from the scope of the invention as claimed in the appending claims.

I claim:

1. A rotatable suction container filling machine comprising in combination a supply vessel, tables for supporting the containers to be filled arranged around the supply vessel and a supply tube for said vessel, a vacuum container of annular shape mounted over said supply vessel and having an outside dimension approximately corresponding to the distance between the said tables and the rotation axis of the machine, and an inside dimension greater than the diameter of said supply tube, said supply tube being arranged freely in the inner free space of said annular vacuum container and being supported solely by said supply vessel, filling nozzle mounted over the table, a filling tube connecting each nozzle with the supply vessel and a vacuum tube connecting each nozzle with the vacuum container.

2. A rotatable, suction, container-filling machine comprising a table and means for rotating the same, a supply vessel on said table, an annular vacuum chamber above said supply vessel and independent thereof, a supply tube for said supply vessel, said tube passing over said vacuum chamber and through the opening thereof and leading to and being supported solely by said supply vessel, means connecting said supply vessel and vacuum chamber, a container filling nozzle connecting said means and a container support on said table rotatable into position under said nozzle for presenting a container thereto.

HANS HANNOVER.

REFERENCES CITED

The following references are of record in the file of this patent:

UNITED STATES PATENTS

| Number | Name | Date |
| --- | --- | --- |
| 1,046,048 | Bastian | Dec. 3, 1912 |
| 1,665,948 | Broadhurst | Apr. 10, 1928 |
| 2,353,277 | Stewart et al. | July 11, 1944 |